United States Patent Office 3,210,335
Patented Oct. 5, 1965

1

3,210,335
MONOAZO DYESTUFFS CONTAINING A PARA-ALKYLATED PHENOL COUPLING COMPONENT
Christian Zickendraht, Binningen, and Arthur Buehler, Rheinfelden, Switzerland, assignors to Ciba Limited, Basel, Switzerland, a company of Switzerland
No Drawing. Filed Oct. 26, 1961, Ser. No. 147,757
Claims priority, application Switzerland, Nov. 3, 1960, 12,331/60
9 Claims. (Cl. 260—206)

The present invention provides new azo dyestuffs which are free from sulfonic acid and carboxylic acid groups, and which correspond to the formula (1)

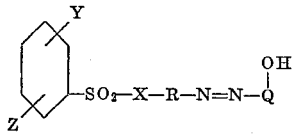

in which

represents the radical of a phenol which is bound to the azo bridge at a position adjacent to the hydroxyl group and which is alkylated at the para-position to the hydroxyl group, R represents an arylene group of the benzene series which contains no salt-forming substituents, X represents a divalent bridge member of which the linking atom has an atomic weight from 14 to 16, e.g. an —O—, an —NH— or an

group, with up to 5 carbon atoms, especially an —N(CH$_3$)— group, Y represents a halogen atom, a lower alkyl or alkoxy group which may contain non-salt-forming substituents and which contain up to 5 carbon atoms or preferably represents a hydrogen atom and Z represents a hydrogen atom, an alkoxy group or preferably a halogen atom or an alkyl group.

The new dyestuffs may be prepared by coupling a para-alkylated phenol which is capable of being coupled at a position adjacent to the hydroxyl group, with a diazo compound of an amine of the formula

2)

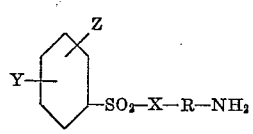

in which R, X, Y and Z have the meanings given above in connection with the Formula 1.

Suitable para-alkylated phenols, which preferably contain up to two further substituents selected from the group consisting of an acylamino and an alkyl group are, for example, para-cresol, 3:4-dimethylphenol, 4-isobutyl-phenol, 4-iso-amyl-phenol, 4-methyl-2-acylamino-phenols such, for example, as 4-methyl-2-acetylamino-phenol, 2-methane-sulfonylamino-phenol and 2-n-butyryl-amino-phenol, and phenols containing a tertiary amyl, isooctyl, secondary butyl or cyclohexyl group in para-position to the hydroxyl group.

2

The diazo components which are coupled with the above-mentioned phenols, are obtained by diazotizing an aminobenzene which contains an amino or a hydroxyl group which is acylated through a sulfonyl group of the formula (3)

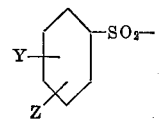

in which Y and Z have the meanings given above in connection with Formula 1, and which amino-benzene contains no free hydroxyl group and no additional —NH$_2$ group. Aminobenzenes of this type are, for example 1-amino-3- or -4-benzene-sulfonylamino-benzene,
1-amino-3- or -4-benzene-sulfonylhydroxy-benzene,
1-amino-3- or -4-(4'-methyl-benzene-sulfonylamino)-benzene,
1-amino-3- or -4-(4'-methyl-benzene-sulfonyloxy)-benzene,
1-amino-2-chloro-3-(4'-methyl-benzene - sulfonylamino)-benzene,
1-amino-2-methyl-3-(4'-methyl-benzene - sulfonylamino)-benzene,
1-amino-3- or -4-(3'-chlorobenzene-sulfonylamino)-benzene,
1-amino-3- or -4-(N-methyl-N-para-methyl-benzene-sulfonylamino)-benzene, and
1-amino-3- or -4-(N-methyl-N-benzene-sulfonylamino)-benzene.

The diazotization of the above-mentioned amines and the coupling reactions are carried out according to methods in themselves known. Advantageously, the coupling is carried out in an alkaline medium, for example, in a medium containing an alkali-metal carbonate and/or an alkali-metal hydroxide.

The dyestuffs of the invention may also be prepared by a modification of the above process, wherein the basic dyestuff, the radical of the diazo component of which still contains a single hydroxyl or amino group, is first prepared by coupling one of the above-mentioned phenols with a diazotized aminobenzene, and then introducing a radical of the Formula 3 by condensation, for example by treating it with the appropriate sulfonic acid-chloride.

The dyestuffs prepared in the above manner are new compounds, and in the dry state they are obtained as substantially water-insoluble powders.

The new dyestuffs are soluble in organic solvents such, for example, as esters and especially in alcohol and in acetone. They may be used for dyeing natural or synthetic resins, waxes, lacquers or plastic masses such, for example, as cellulose-ethers or -esters, or, for example, for spin-dyeing acetate rayon or for dyeing natural or synthetic polymers or condensation products.

By using the new dyestuffs, acetate rayon, for example, may be dyed by the spin-dyeing process, clear, fast, yellow tints.

The following examples illustrate the invention. The parts and percentages are parts and percentages by weight:

*Example 1*

13.2 parts of 4-methyl-benzene-1-sulfonic acid-(4'-aminophenyl)-ester, obtained by condensing 4-methylbenzene-1-sulfochloride with 4-nitro-1-hydroxy-benzene and then catalytically reducing the nitro-ester, are dissolved in 100 parts of water and 14.6 parts of hydrochloric acid. The solution is diazotized at 0–5° C. with 3.45 parts of sodium nitrite. The diazotization mass is then combined with a solution of 7.5 parts of 4-tertiary-amyl-1-hydroxy-benzene in 100 parts of water, 6.7 parts of a solution of 30% strength of sodium hydroxide and with 2.5 parts of sodium carbonate. The mixture is stirred for some time, and then filtered. The dried dyestuff is obtained as a yellow, water-insoluble powder that is readily soluble in alcohol or acetone and that dyes bulk acetate rayon yellow tints which are fast to light and washing.

Example 2

14.6 parts of 4-methyl-benzene-1-sulfonic acid-(4'-aminophenyl)-amide, obtained by condensing 4-methyl-benzene-1-sulfochloride with 4-nitro-1-aminobenzene and then reducing the nitro-sulfonamide, are dissolved in 100 parts of water and 13.3 parts of a solution of 30% strength of sodium hydroxide, and then, after the addition of 3.45 parts of sodium nitrite, the mass is poured into 24 parts of hydrochloric acid and ice. The diazo suspension is then neutralized with sodium carbonate and then combined with a solution of 7.5 parts of 4-tertiary-amyl-1-hydroxy-benzene in 100 parts of water and with 6.7 parts of a solution of 30% strength of sodium hydroxide. The mixture is stirred for some time, and then filtered. The dried dyestuff is obtained as a yellow, water-insoluble powder that is readily soluble in alcohol or acetone. A solution of the dyestuff in nitro-cellulose lacquer yields on appropriate sub-strata, yellow tints that are fast to light.

By using the diazo compound of an amine given in column I of the following table and the phenol given in column II, in the process described above, dyestuffs are obtained which dye acetate rayon by the spin-dyeing process the tints shown in column III:

| | I | II Coupling Component | III Tint |
|---|---|---|---|
| 1 | $CH_3$—⟨ ⟩—$SO_2$—O—⟨ ⟩—$NH_2$ | OH—⟨ ⟩—$C_4H_9$ | Yellow. |
| 2 | $CH_3$—⟨ ⟩—$SO_2$—O—⟨ ⟩—$NH_2$ | OH—⟨ ⟩—$CH_3$ | Do. |
| 3 | $CH_3$—⟨ ⟩—$SO_2$—O—⟨ ⟩—$NH_2$ | OH—⟨ ⟩—$CH_3$ | Do. |
| 4 | $CH_3$—⟨ ⟩—$SO_2NH$—⟨ ⟩—$NH_2$ | OH—⟨ ⟩—$CH_3$ | Do. |
| 5 | $CH_3$—⟨ ⟩—$SO_2HN$—⟨ ⟩(—$NH_2$)—Cl | OH—⟨ ⟩(—$CH_3$)—$CH_3$ | Yellow-orange. |
| 6 | $CH_3$—⟨ ⟩—$SO_2$—N($CH_3$)—⟨ ⟩—$NH_2$ | OH—⟨ ⟩—$CH_3$ | Yellow. |
| 7 | Cl—⟨ ⟩—$SO_2$—O—⟨ ⟩—$NH_2$ | OH—⟨ ⟩—$C_5H_{11}$ | Do. |

| | I | II Coupling Component | III Tint |
|---|---|---|---|
| 8 | 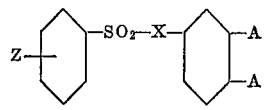 |  | Yellow. |
| 9 | 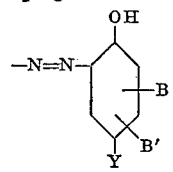 |  | Do. |

What is claimed is:

1. A dyestuff free from sulfonic acid and carboxylic acid groups and corresponding to the formula

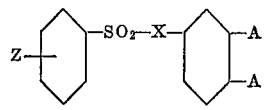

in which Z represents a member selected from the group consisting of hydrogen, chlorine and methyl, X is a member selected from the group consisting of an —O—, —NH— and $$-\underset{CH_3}{\underset{|}{N}}-$$

bridge, one A represents a member selected from the group consisting of hydrogen, chlorine and methyl and the other A represents the grouping

wherein Y represents an alkyl group of 1 to 5 carbon atoms, B is a member selected from the group consisting of hydrogen and acylamino, acyl meaning the radical of a lower aliphatic carboxylic acid, and B' is a member selected from the group consisting of methyl and hydrogen, at least one of the symbols B and B' being hydrogen.

2. A dyestuff free from sulfonic acid and carboxylic acid groups and corresponding to the formula

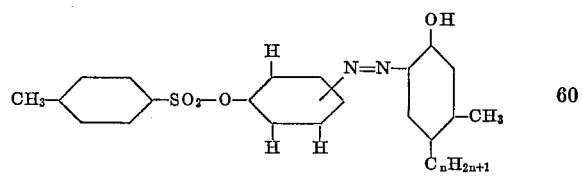

wherein $n$ is a positive whole number up to 6.

3. A dyestuff free from sulfonic acid and carboxylic acid groups and corresponding to the formula

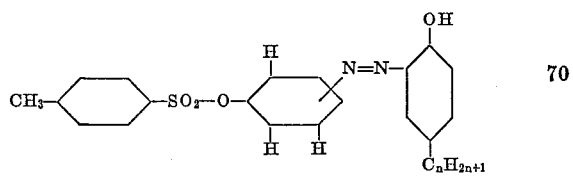

wherein $n$ is a positive whole number up to 6.

4. A dyestuff free from sulfonic acid and carboxylic acid groups and corresponding to the formula

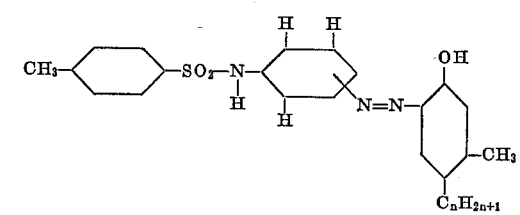

wherein $n$ is a positive whole number up to 6.

5. A dyestff free from sulfonic acid and carboxylic acid groups and corresponding to the formula

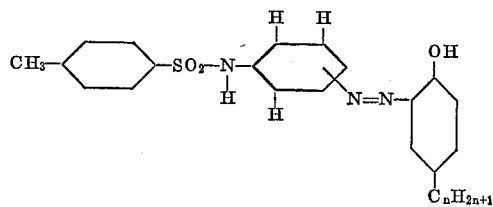

wherein $n$ is a positive whole number up to 6.

6. The dyestuff corresponding to the formula

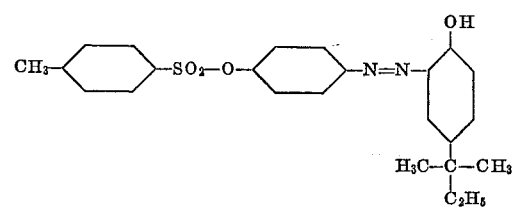

7. The dyestuff corresponding to the formula

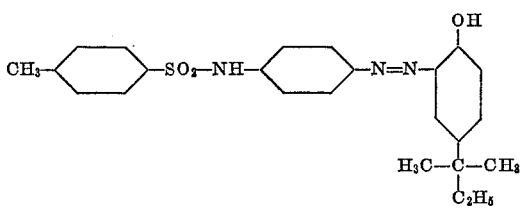

8. The dyestuff corresponding to the formula
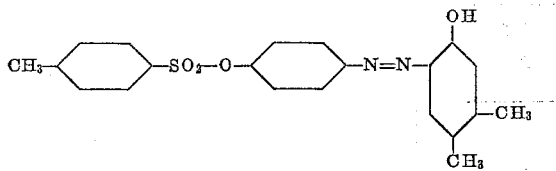
9. The dyestuff corresponding to the formula
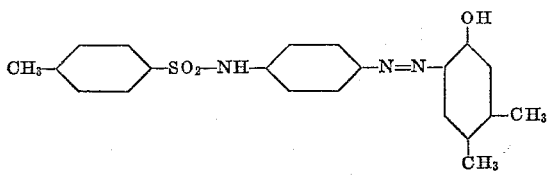
References Cited by the Examiner
UNITED STATES PATENTS
| | | | |
|---|---|---|---|
| 1,067,881 | 7/13 | Richard | 260—206 X |
| 1,848,772 | 3/32 | Felix | 260—206 X |
| 2,266,413 | 12/41 | Crossley | 260—206 X |
| 2,328,570 | 9/43 | McNally et al. | 260—206 X |
| 2,549,922 | 4/51 | Neier et al. | 260—206 |
| 2,864,816 | 12/58 | Nicolaus et al. | 260—207 |
| 3,112,304 | 11/63 | Senn | 260—207 |
FOREIGN PATENTS
469,514  12/28  Germany.
CHARLES B. PARKER, *Primary Examiner.*